Figure 2:
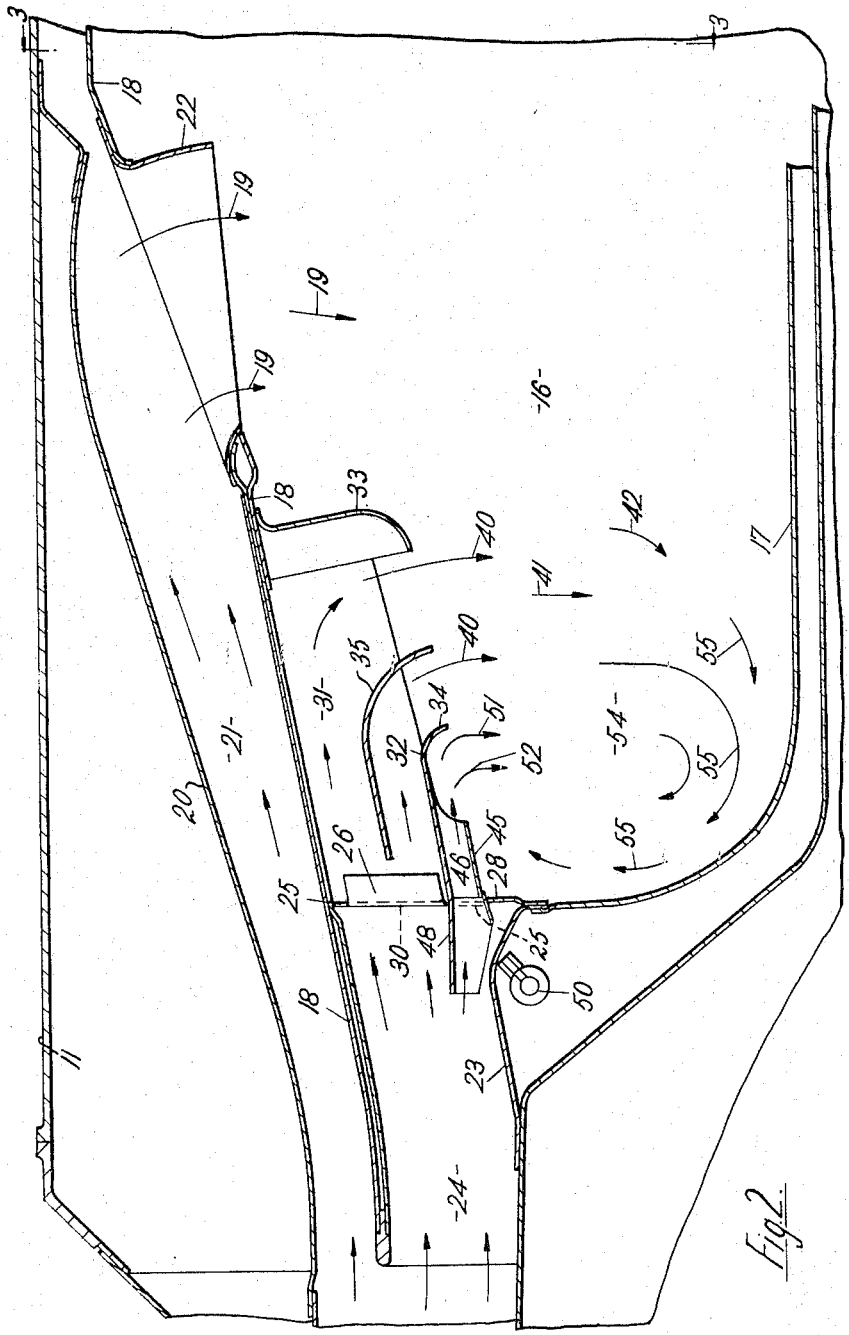

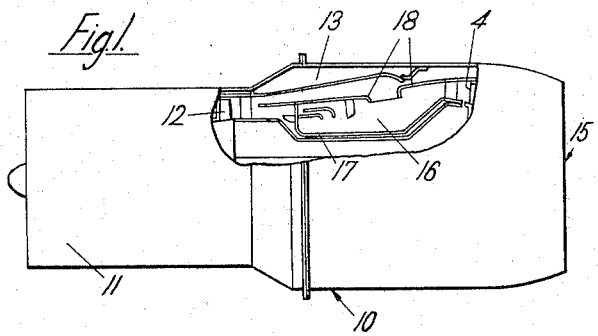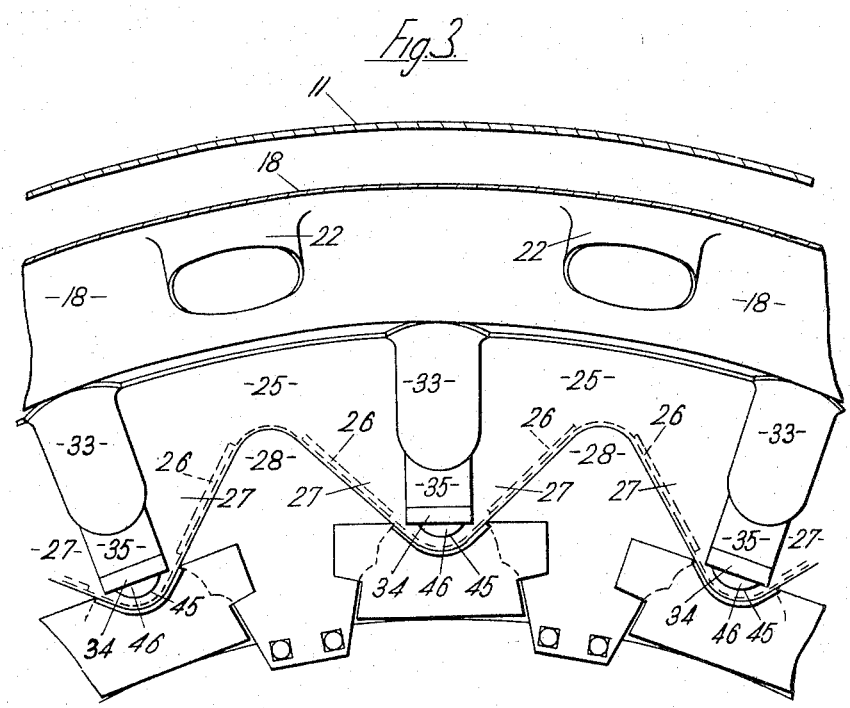

United States Patent Office 3,290,880
Patented Dec. 13, 1966

3,290,880
COMBUSTION EQUIPMENT FOR A GAS
TURBINE ENGINE
John Richard Poyser, Spondon, Derby, England, assignor to Rolls-Royce Limited, Derby, England, a company of Great Britain
Filed Jan. 15, 1965, Ser. No. 425,861
Claims priority, application Great Britain, Feb. 21, 1964, 7,469/64
5 Claims. (Cl. 60—39.65)

This invention concerns combustion equipment for a gas turbine engine.

According to the present invention there is provided combustion equipment for a gas turbine engine comprising an elongate flame tube, ducting, including primary, secondary and dilution air ducts, extending along the outer side only of and communicating with said flame tube and through which combustion air and dilution air may flow, and means for introducing combustion air and dilution air into said flame tube transversely thereof from said ducting.

Preferably the upstream portions of the primary and secondary air ducts form parts of a common combustion air duct divided by wall members into said primary and secondary air ducts.

Preferably the means for introducing secondary air and dilution air into said flame tube transversely thereof comprise baffles non-integrally mounted on and secured to the secondary air duct and to the dilution air duct, respectively.

Preferably there is a fuel injector, located upstream of the flame tube, for injecting fuel into the primary air duct, the primary air duct being axially extending and being provided with a radially directed flange, the fuel/air mixture passing axially into the flame tube and being turned transversely by the flange.

Preferably a series of angularly spaced apart apertures is provided between the dilution air duct and the flame tube, said primary and secondary air ducts being disposed between two adjacent apertures.

The invention also includes a gas turbine engine provided with combustion equipment as set forth above.

The invention is illustrated, merely by way of example, in the accompanying drawings, in which:

FIGURE 1 is a cut away schematic elevation of a gas turbine engine provided with combustion equipment according to the present invention, FIGURE 2 is an enlarged, cross sectional elevation of part of the engine shown in FIGURE 1, and FIGURE 3 is an end elevation of the component shown in FIGURE 2 taken on line 3—3 of that figure.

Referring to the drawings, a gas turbine engine 10 comprises a casing 11 within which there is disposed, in axial flow series, a compressor 12, combustion equipment 13, turbine 14 and exhaust nozzle 15.

Combustion equipment 13 comprises an annular flame tube 16 having internal and external annular walls 17, 18. Disposed between annular wall 18 and casing 11 is a further annular wall 20 which defines with annular wall 18 an annular dilution or tertiary air duct 21. Disposed within a series of angularly spaced apart apertures in wall 18 are wall members 22 which lead from dilution air duct 21 and extend into the flame tube 16. The wall members 22 are designed to cause dilution air to flow transversely of elongate flame tube 16, as indicated by arrows 19.

At the upstream end of wall 17, a further annular wall 23 is attached thereto, defining, with annular wall 18, an annular combustion air duct 24. A toothed annulus 25 is disposed within and partially blocks duct 24, extending transversely of the elongate flame tube 16. Side walls 26 are provided along each side of the teeth 27 of annulus 25 and these are connected to support plates 28 which are rigidly attached to wall 23. Thus annulus 25 is attached to wall 23 by plates 28.

A slot 30 is formed in each of the teeth 27 of annulus 25 and each slot 30 communicates with a secondary air duct 31 defined between wall 18 and a further wall member 32. The downstream end of each secondary air duct 31 is blocked by a member 33 attached to wall 18. The downstream end of member 32 is rolled over as at 34, and a guide member 35 is provided in secondary air duct 31 which also follows the line of the rolled end 34. The rolled end 34, guide member 35 and blocking member 33 are designed to cause secondary air flowing through duct 31 to flow transversely of elongate flame tube 16, as indicated by arrows 40, 41, 42, upon entering the flame tube.

Attached to each wall member 32 is a tube 45 defining with wall member 32 a primary air duct 46. Air from combustion air duct 24 is divided between secondary air duct 31 and primary air duct 46 by a dividing member 48. A fuel injector 50 is provided for each primary air duct 46, and the fuel/air mixture flowing through each primary air duct is deflected by the rolled end 34 to flow transversely of the elongate flame tube, as indicated by arrows 51, 52.

As well as being directed transversely of the elongate flame tube 16, the fuel/air mixture leaving duct 46 is prevented from flowing directly downstream by the "wall" of secondary air provided by the air flowing as indicated by arrows 40, 41, 42. Due to this transverse flow of primary air and fuel, and of secondary air, a swirl or vortex is formed in the combustion zone 54 as indicated by arrows 55. The effect of this swirl or vortex is to ensure adequate mixing of all the fuel and air and consequent efficient combustion of the mixture within the relatively short combustion zone 54. Due to the "barrier" or "wall" of secondary air, no unburnt fuel passes out of the combustion zone 54, and thus no "hot streaks" are formed in the chamber or in the turbine.

The combustion gases, when burnt, leave the combustion zone, mingle with the dilution air from duct 21 and pass to the turbine 14. It will be appreciated that the affect of directing the dilution air transversely of the elongate flame tube will also be to retain the fuel/air mixture in combustion zone 54 and to ensure adequate mixing of the combustion gases and dilution air in a relatively short length.

Improved efficiency is achieved by directing the primary, secondary and tertiary air transversely of the elongate flame tube, and this is helped by the fact that the combustion air and dilution air ducts are disposed along the one wall 18 of the flame tube. Thus the air is directed into the flame tube from one side only, and the sheltered zone provided by the upstream end of the flame tube can be utilised in reversing the direction of flow of the air.

It will be appreciated that the invention is equally applicable to combustion equipment having a plurality of angularly spaced apart flame tubes as well as that having an annular flame tube as hereinbefore described.

It will also be appreciated that, instead of having the dilution air duct only outside the flame tube, the combustion air ducts i.e. primary and secondary, could also be disposed externally of the flame tube. In this case, apertures provided in the dividing wall btween the external ducting and the flame tube would be used to lead air from the external ducting into the flame tube. Means would, of course, be provided to direct the air transversely of the flame tube, and the air would be introduced from one side only of the flame tube. Thus all the advantages of the invention would be retained.

I claim:
1. Combustion equipment for a gas turbine engine comprising: an elongate flame tube; ducting, including primary, secondary and dilution air ducts extending along the outer side only of and communicating with said flame tube and through which combustion air and dilution air may flow; and means for introducing combustion air and dilution air into said flame tube transversely thereof from said ducting.

2. Combustion equipment as claimed in claim 1 including a common combustion air duct, having at least one wall member in the downstream portion thereof for dividing the same into at least the upstream portions of said primary and secondary air ducts.

3. Combustion equipment as claimed in claim 1 wherein said means for introducing secondary air and dilution air into said flame tube transversely thereof comprise radially directed wall members secured to the secondary air duct and to the dilution air duct, respectively.

4. Combustion equipment as claimed in claim 1 including a fuel injector positioned upstream of the flame tube for injecting fuel into the primary air duct, the primary aid duct being axially extending and being provided with a radially directed end portion, the fuel/air mixture passing axially into the flame tube and being turned transversely by the flange.

5. Combustion equipment as claimed in claim 1 wherein a series of angularly spaced apart apertures is provided between the dilution air duct and the flame tube, said primary and secondary air ducts being disposed between two adjacent apertures.

References Cited by the Examiner

UNITED STATES PATENTS

| | | | |
|---|---|---|---|
| 2,977,760 | 4/1961 | Soltau | 60—39.65 |
| 3,055,179 | 9/1962 | Lefebvre | 60—39.65 |

FOREIGN PATENTS 231,310   4/1959   Australia.

MARK NEWMAN, *Primary Examiner.*

RALPH D. BLAKESLEE, *Examiner.*